US012227244B2

(12) United States Patent
Wearmouth et al.

(10) Patent No.: US 12,227,244 B2
(45) Date of Patent: Feb. 18, 2025

(54) SAFETY RAIL

(71) Applicant: Safesmart LLC, Santa Fe Springs, CA (US)

(72) Inventors: Shane J. Wearmouth, Los Angeles, CA (US); Jeffrey K. Wearmouth, Maungaturoto (NZ)

(73) Assignee: Safesmart LLC, Santa Fe Springs, CA (US)

( * ) Notice: Subject to any disclaimer, the term of this patent is extended or adjusted under 35 U.S.C. 154(b) by 919 days.

(21) Appl. No.: 17/301,120

(22) Filed: Mar. 25, 2021

(65) Prior Publication Data
US 2022/0306224 A1   Sep. 29, 2022

(51) Int. Cl.
*E04G 5/14* (2006.01)
*B62D 63/08* (2006.01)
*E04G 1/14* (2006.01)

(52) U.S. Cl.
CPC ............ *B62D 63/08* (2013.01); *E04G 1/14* (2013.01); *E04G 5/14* (2013.01)

(58) Field of Classification Search
CPC .... E04G 1/14; E04G 5/04; E04G 5/14; E04G 21/3223; E04G 21/3228; E04G 5/142; B65G 69/2888; E04H 17/18; A01K 3/001
See application file for complete search history.

(56) References Cited

U.S. PATENT DOCUMENTS

| | | | | |
|---|---|---|---|---|
| 529,745 A * | 11/1894 | McIntyre | ................ | F16B 2/08 |
| | | | | 425/DIG. 126 |
| 1,890,029 A * | 12/1932 | Delfs | ...................... | E04G 5/04 |
| | | | | 182/87 |
| 2,706,662 A * | 4/1955 | Brown | ..................... | E04G 5/14 |
| | | | | 24/535 |
| 2,766,016 A * | 10/1956 | Miller | .................... | E04H 17/18 |
| | | | | D25/48.5 |
| 3,429,398 A | 2/1969 | Reynolds et al. | | |
| 4,236,698 A * | 12/1980 | Compte | ............. | E04G 21/3223 |
| | | | | 182/113 |
| 4,301,627 A * | 11/1981 | Wilson | ..................... | E04H 3/28 |
| | | | | 52/6 |
| 4,371,057 A * | 2/1983 | Blier | ....................... | E04G 1/32 |
| | | | | 182/201 |

(Continued)

FOREIGN PATENT DOCUMENTS

CN    201685778 U    12/2010
CN    203512446 U    4/2014
(Continued)

OTHER PUBLICATIONS

SafeRack Device Brochure.

*Primary Examiner* — Colleen M Chavchavadze
(74) *Attorney, Agent, or Firm* — Luedeka Neely, P.C.

(57) ABSTRACT

A safety rail having an upright support with two substantially parallel vertical members separated by a space. The vertical members extend from a bottom end to a height, and cross members span the space and connect together the vertical members. A horizontal member connects to the bottom end of the vertical members. An attachment member is connected to at least one of the vertical members, where the attachment member is adapted to connect to a platform. A guard rail connects to at least one of the vertical members.

11 Claims, 3 Drawing Sheets

(56) References Cited

U.S. PATENT DOCUMENTS

| | | | | |
|---|---|---|---|---|
| 4,430,839 | A * | 2/1984 | Butters | E04G 1/14 182/178.3 |
| 4,938,310 | A * | 7/1990 | Larsen | E04G 5/00 187/241 |
| 5,145,030 | A * | 9/1992 | Pavlescak | E04G 5/14 182/113 |
| 5,431,372 | A * | 7/1995 | Kostelecky | E04G 21/3223 256/64 |
| 5,599,006 | A * | 2/1997 | Gevaux | E01F 13/022 256/25 |
| 5,647,451 | A * | 7/1997 | Reichel | E04G 5/041 182/113 |
| 5,779,227 | A * | 7/1998 | Elkins | E04H 17/18 256/26 |
| 5,967,258 | A | 10/1999 | Scott et al. | |
| 6,481,697 | B1 * | 11/2002 | Brown | E04F 11/1834 256/64 |
| 7,028,990 | B2 * | 4/2006 | Shorey | E04G 5/041 256/19 |
| 7,077,239 | B1 * | 7/2006 | Hayman | E04G 7/305 182/178.1 |
| 7,832,525 | B2 * | 11/2010 | Bennett | B65G 69/22 182/36 |
| 8,196,348 | B2 * | 6/2012 | Flannery | E06B 9/04 49/55 |
| 8,424,641 | B2 * | 4/2013 | Pandazopoulos | E04G 21/3223 182/113 |
| 8,584,803 | B2 * | 11/2013 | Sani | E04G 3/30 182/112 |
| 8,875,440 | B1 * | 11/2014 | Duran | E04H 17/14 49/34 |
| 8,985,274 | B2 * | 3/2015 | Sun | E04G 3/28 182/12 |
| 9,027,712 | B2 * | 5/2015 | Melton | B65G 69/22 182/36 |
| 9,260,258 | B1 * | 2/2016 | Leum | B65G 69/2888 |
| 9,273,475 | B1 * | 3/2016 | DuBose | B60P 1/00 |
| 9,382,740 | B2 * | 7/2016 | Flannery | E05D 7/10 |
| 9,573,629 | B2 | 2/2017 | Conny | |
| 9,731,640 | B1 * | 8/2017 | Meacham | B60R 3/005 |
| 10,538,929 | B2 * | 1/2020 | Smith | E04G 21/3228 |
| 11,002,026 | B1 * | 5/2021 | Apostolopoulos | E04G 7/04 |
| 11,549,274 | B2 * | 1/2023 | Black | E04G 21/3204 |
| 11,761,217 | B2 * | 9/2023 | Curtis | E04G 5/145 182/113 |
| 2003/0061779 | A1 * | 4/2003 | Wyse | E04G 5/16 52/651.1 |
| 2003/0178253 | A1 * | 9/2003 | Tatge | E04G 5/061 182/132 |
| 2005/0167195 | A1 * | 8/2005 | Chipman | E04G 5/14 182/17 |
| 2005/0189173 | A1 * | 9/2005 | Becker | E04G 5/141 182/113 |
| 2006/0260217 | A1 * | 11/2006 | Black | E04G 21/3204 52/127.2 |
| 2007/0045048 | A1 * | 3/2007 | Wyse | E04G 1/24 182/178.1 |
| 2009/0217591 | A1 * | 9/2009 | LaCook | E04G 5/144 49/50 |
| 2010/0281816 | A1 * | 11/2010 | Vigneault | E04G 5/046 52/701 |
| 2011/0132685 | A1 * | 6/2011 | Dos Santos | E04G 1/24 182/113 |
| 2011/0188984 | A1 * | 8/2011 | Hofer | E04G 5/16 403/292 |
| 2013/0126270 | A1 * | 5/2013 | Darby | E04G 5/14 256/65.01 |
| 2014/0255086 | A1 * | 9/2014 | Wallther | E04G 7/12 403/205 |
| 2015/0041252 | A1 * | 2/2015 | Grumberg | E04G 5/165 182/222 |
| 2016/0130824 | A1 * | 5/2016 | Chang | E04G 1/14 182/113 |
| 2017/0009485 | A1 * | 1/2017 | Gentry | E01F 13/022 |
| 2017/0356203 | A1 * | 12/2017 | Nagel | E04G 21/3228 |
| 2018/0066474 | A1 * | 3/2018 | Johansson | E06C 7/423 |
| 2018/0073258 | A1 * | 3/2018 | Mikic | E04G 5/061 |
| 2019/0352920 | A1 * | 11/2019 | Salyer | E04G 5/007 |
| 2020/0270882 | A1 * | 8/2020 | Buenemann | E04G 21/3233 |
| 2021/0025182 | A1 * | 1/2021 | Bratland | E04G 11/48 |
| 2021/0095484 | A1 * | 4/2021 | Moeggenborg | E04G 5/062 |
| 2021/0276849 | A1 * | 9/2021 | Shafer | E04G 5/142 |
| 2022/0042327 | A1 * | 2/2022 | Depot | E04G 3/18 |
| 2022/0349191 | A1 * | 11/2022 | Melic | F16B 2/10 |
| 2023/0203825 | A1 * | 6/2023 | Christie | E04G 5/16 182/115 |

FOREIGN PATENT DOCUMENTS

| | | | | |
|---|---|---|---|---|
| CN | 111335615 | A * | 6/2020 | |
| EP | 3018000 | A3 | 5/2016 | |
| GB | 2357542 | A * | 6/2001 | E04G 5/00 |
| GB | 2406313 | A | 3/2005 | |
| GB | 2488831 | A | 9/2012 | |
| GB | 2576965 | A | 3/2020 | |
| KR | 101833878 | B1 * | 3/2018 | |
| WO | WO-02077392 | A1 * | 10/2002 | E04G 5/14 |
| WO | 2011158035 | A1 | 12/2011 | |
| WO | 2019007119 | A1 | 1/2019 | |

* cited by examiner

SAFETY RAIL

FIELD

This invention relates to the field of safety rails. More particularly, this invention relates to a safety rail system such as for a flat-bed trailer.

INTRODUCTION

Working on top of flat-bed trailers, such as during loading and unloading operations, can be very dangerous. Although the top surface of a flat-bed trailer is not all that high off the ground, falling off the trailer can nonetheless cause very serious injuries.

A wide variety of safety devices have been developed to help prevent such falls and their subsequent injuries. However, these devices all tend to suffer from one or more of a variety of different issues that make their use less than universal.

For example, some of these devices are extremely cumbersome, and thus they are difficult, labor-intensive, and time-consuming both to store when not in use and to set up when use is desired. Other devices are very expensive and thus either cannot be purchased by some who could otherwise make use of them or cannot be purchased in sufficient numbers to be used to the extent necessary. In addition, some devices are configured for only one specific arrangement of flat-bed trailer, such as only a single given length of a flat-bed trailer or only a single given height of a flat-bed trailer, and thus are not of optimal use for flat-bed trailers that are alternately configured.

Thus, some who could benefit from the safety that could otherwise be offered by the use of these devices tend to forego their use—often with disastrous consequences.

What is needed, therefore, is a safety device that tends to reduce issues such as those indicated above, at least in part.

SUMMARY

The above and other needs are met by a safety rail having an upright support with two substantially parallel vertical members separated by a space. The vertical members extend from a bottom end to a height, and cross members span the space and connect together the vertical members. A horizontal member connects to the bottom end of the vertical members. An attachment member is connected to at least one of the vertical members, where the attachment member is adapted to connect to a platform. A guard rail connects to at least one of the vertical members.

In various embodiments according to this aspect of the invention, the guard rail is selectively releasably connected to the at least one of the vertical members. Some embodiments include a scaffold clamp that selectively releasably connects the guard rail to the at least one of the vertical members. In some embodiments, the vertical members are selectively releasably connected to the horizontal member. In some embodiments, the attachment member is selectively slidably connected along the height of the at least one of the vertical members. In some embodiments, the cross members are spaced one from another at a distance of about 500 millimeters along the height. Some embodiments include three of the guard rails that are each connected to two of the upright supports. In some embodiments, the attachment member includes a chain. In some embodiments, the guard rail has a diameter of about 48.3 mm with a wall thickness of about 4 mm. In some embodiments, the horizontal member and the vertical members form an L shape. In some embodiments, the upright support includes leveling feet that are attached to a bottom surface of the horizontal member. In some embodiments, the upright support includes wheels that are attached to a bottom surface of the horizontal member.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
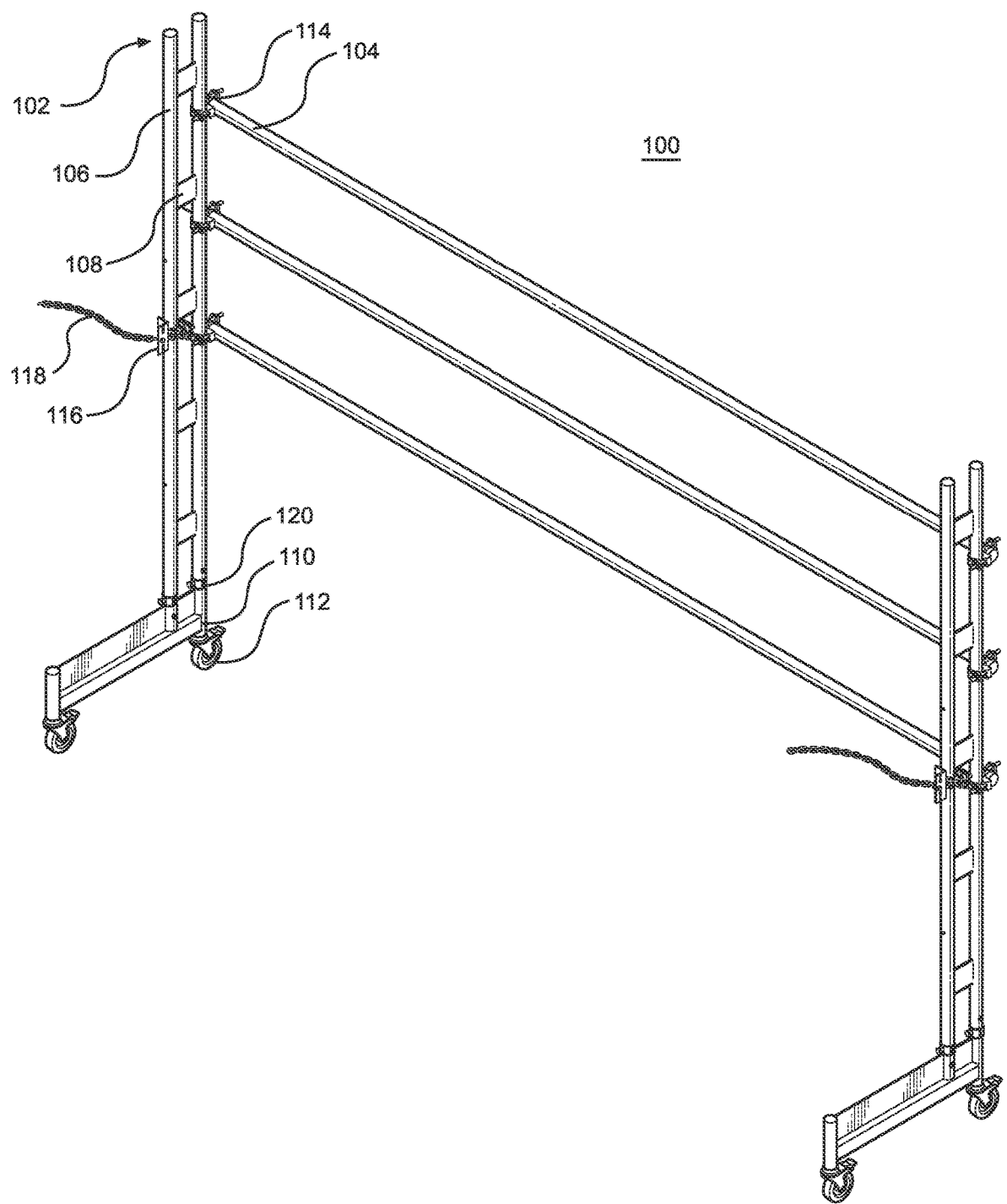
FIG. 1 is a perspective view of a safety rail according to an embodiment of the present invention.
Figure 2:
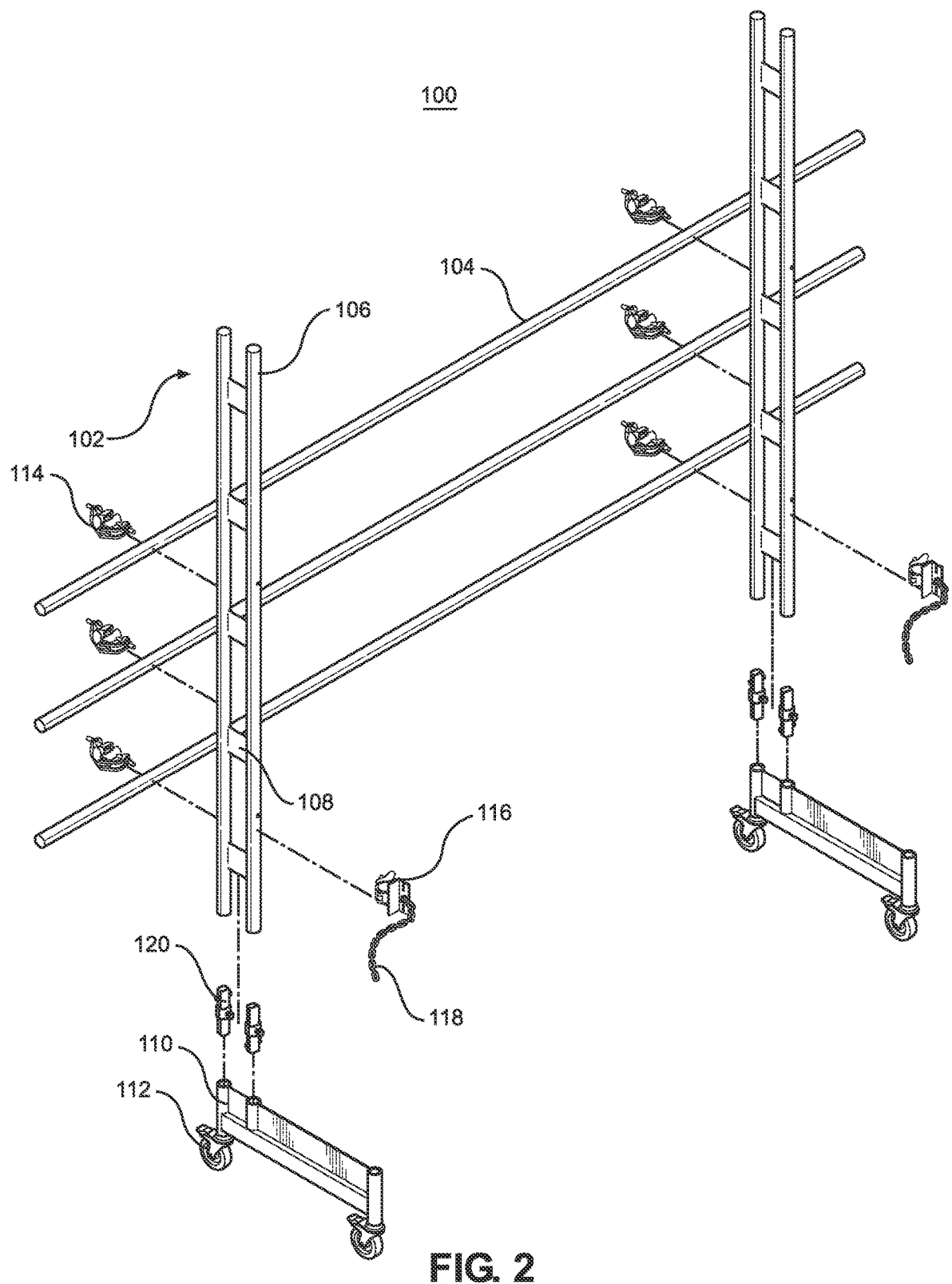
FIG. 2 is an exploded view of a safety rail according to an embodiment of the present invention.
Figure 3:
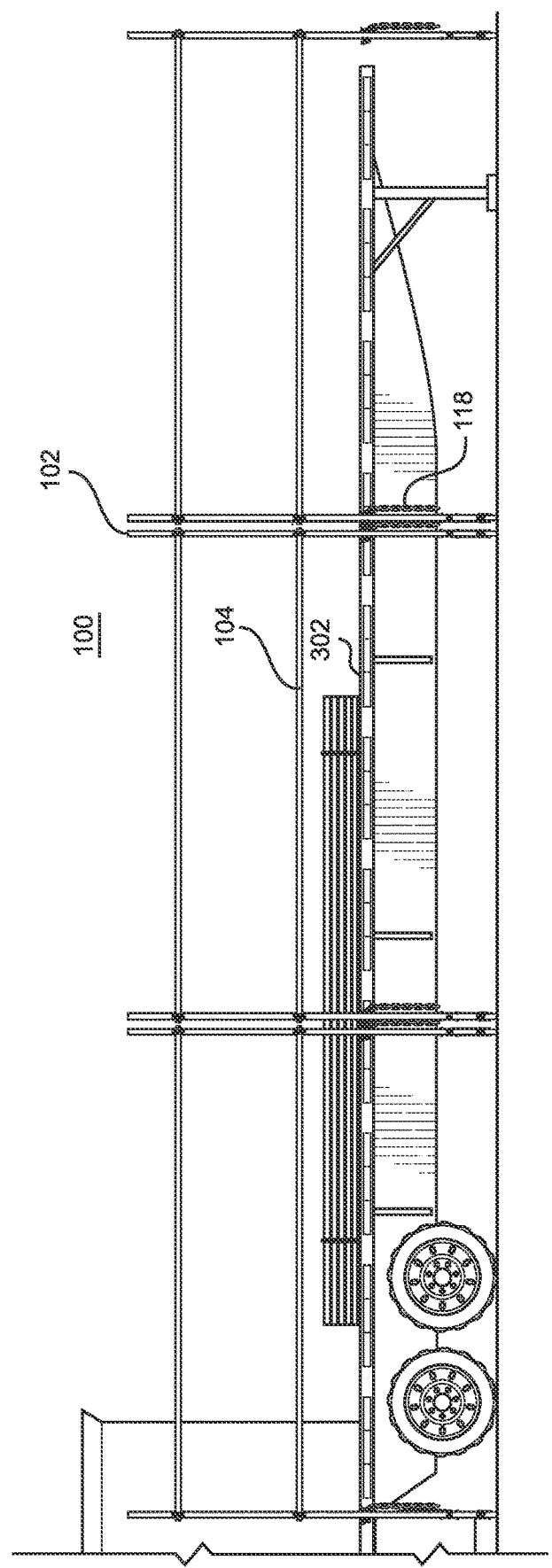
FIG. 3 is a depiction of a safety rail in a deployed position according to an embodiment of the present invention.

With reference now to the figures, there is depicted a safety rail 100 according to an embodiment of the present invention. The safety rail 100 includes at least one upright support 102 and at least one guard rail 104. The upright support 102 includes two spaced, substantially parallel, vertical members 106. The two vertical members 106 are connected one to another with cross members 108. The two vertical members 106 are connected at the bottom to a horizontal member 110. An attachment member 118 is connected to at least one of the vertical members 106 of the upright support 102.

In this basic embodiment as described above, the safety rail 100 can be placed on the ground next to a flat bed trailer 302. The horizontal members 110 keep the safety rail 100 from falling over when it is free-standing. The attachment member 118 is used to fasten the safety rail 100 to the flat bed trailer 302, thereby keeping the safety rail 100 in stable and close proximity to the trailer 302. One or more of the guard rails 104 are fastened to the upright member 102 at heights that are selected according to the activity on the trailer 302, and which prevent workers or materials from falling off the trailer 302, such as during loading and unloading operations.

In one embodiment, two upright supports 102 can be used to hold one or more guard rails 104 between them, and this configuration can be repeated multiple times along the length of the trailer 302. In another embodiment, many guard rails 104 can be staggered between several upright supports 102 extending along the length of the trailer 302 and, in this manner, provide a relatively continuous safety rail 100 along the length of the trailer 302.

When the safety rail 100 is not in use, it is small and light enough for one or two workers to move it to a storage location, and small enough so that many of the safety rails 100 do not take up much storage space. Further, when not in use, the safety rail 100 can be easily disassembled, as described in more detail hereinafter, stored, and then easily and quickly reassembled as needed, in either the same or in a different configuration of upright supports 102 and guard rails 104.

In some embodiments, the guard rail 104 is selectively releasably attached to the upright support 102. For example, in some embodiments the guard rails 104 are standard scaffolding rails with an outer diameter of about 48.3 mm with a wall thickness of about 4 mm, and the attachments 114 that are used to attach the guard rails 104 to the upright supports 102 are scaffolding clamps.

In some embodiments the guard rails 104 and upright supports 102 are formed of at least one of metal, wood, other natural materials, and plastic or other thermoformed materials.

The two vertical members 106 of the upright support 102 are held together with cross members 108. In one embodiment, metal cross members 108 are welded to the vertical members 106. In one embodiment, the cross members 108 are spaced at a uniform distance, one from another, along the lengths of the vertical members 106, so as to provide a visual guide when attaching the guard rails 104 to the upright supports 102. In one embodiment the cross members 108 are vertically spaced at about 500 mm.

In some embodiments, the upright supports 102 include feet of some kind, such as wheels 112, on the bottom of the horizontal members 110. In some embodiments the feet 112 can be used to help level the safety rail 100, and in some embodiments the feet 112 can make moving the safety rail 100 easier to accomplish. In some embodiments, the wheels 112 have locking mechanisms so that they prevent the safety rail 100 from rolling once the safety rail 100 is placed into the desired position.

In some embodiments the horizontal member 110 is selectively releasable from the vertical members 106, such as with a compression fitting, such as a pin, peg, or dowel, which fits into mating fixtures, such as holes, in both the horizontal member 100 and the ends of the vertical members 106. In some embodiments the vertical members 106 are attached to the horizontal member 110 at a point along the horizontal member 110 where the vertical members 106 and the horizontal member 110 form a generally L-shaped support structure 102. In another embodiment, the vertical members 106 are attached to the horizontal member 110 at a point along the horizontal member 110 where the vertical members 106 and the horizontal member 110 form a generally inverted T-shaped support structure 102.

In some embodiments the attachment member 118 is a chain that is connected to one of the vertical members 106 with a releasable clamp 116, where the releasable clamp 116 can be attached to the vertical member 106 at any point along the height of the vertical member 106 as desired. In other embodiments, the attachment member 118 is a rope or some other kind of strap, such as leather.

As used herein, the phrase "at least one of A, B, and C" means all possible combinations of none or multiple instances of each of A, B, and C, but at least one A, or one B, or one C. For example, and without limitation: Ax1, Ax2+Bx1, Cx2, Ax1+Bx1+Cx1, Ax1+Bx12+Cx113. It does not mean Ax0+Bx0+Cx0.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A free-standing, movable safety rail consisting of:
   two upright L-shaped supports and at least two guard rails releasably connected horizontally between the two upright L-shaped supports using scaffold clamps, wherein each of the two upright L-shaped supports consist of:
      two substantially parallel, spaced-apart vertical members having a bottom end and a top end distal from the bottom end,
      a plurality of cross members welded between the two substantially parallel, spaced-apart vertical members, wherein the plurality of cross-members are disposed orthogonal to the two substantially parallel spaced-apart vertical members and to the at least two guard rails,
      a horizontal member connected to the bottom end of the two substantially parallel, spaced-apart vertical members, wherein the horizontal member is substantially perpendicular to the two substantially parallel, spaced-apart vertical members and to the at least two guard rails,
      a chain, rope, or strap configured to connect between one of the two substantially parallel, spaced-apart vertical members and a platform separate from the free-standing, movable safety rail, and
      wheels or leveling wheels attached to the horizontal member,
   wherein the free-standing, movable safety rail is devoid of a platform configured to support a worker.

2. A worker safety rail consisting of a plurality of adjacent free-standing, movable safety rails of claim 1.

3. The movable safety rail of claim 1, wherein the horizontal member is releasably connected to the bottom end of the two substantially parallel, spaced-apart vertical members.

4. The movable safety rail of claim 1, wherein the chain, rope or strap is selectively slidably connected to the at least one of the two substantially parallel, spaced-apart vertical members.

5. The movable safety rail of claim 1, wherein the plurality of cross members are spaced one from another at a distance of about 500 millimeters.

6. A movable safety rail, consisting of:
   at least two upright L-shaped supports and at least one guard rail releasably connected horizontally between the two upright L-shaped supports, wherein each of the at least two upright L-shaped supports consist of,
      two substantially parallel, spaced-apart vertical members having a bottom end and a top end distal from the bottom end,
      a plurality of cross members welded between the two substantially parallel, spaced-apart vertical members, wherein the plurality of cross-members are disposed orthogonal to the two substantially parallel, spaced-apart vertical members and to the at least one guard rail,
      a horizontal member connected to the bottom end of the two substantially parallel, spaced-apart vertical members, wherein the horizontal member is substantially perpendicular to the two substantially parallel, spaced-apart vertical members and to the at least one guard rail, a chain, rope, or strap configured to connect between one of the two substantially parallel spaced-apart vertical members and a platform separate from the movable safety rail, and wheels or leveling wheels attached to the horizontal member, wherein the movable safety rail is devoid of a platform configured to support a worker.

7. The movable safety rail of claim 6, wherein the at least one guard rail is selectively releasably connected to at least one of the two substantially parallel, spaced-apart vertical members.

8. The movable safety rail of claim 6, wherein the horizontal member is releasably connected to the bottom end of the two substantially parallel, spaced-apart vertical members.

9. The movable safety rail of claim 6, wherein the chain, rope or strap attachment member is selectively slidably connected to at least one of the two substantially parallel, spaced-apart vertical members.

10. The movable safety rail of claim 6, wherein the plurality of cross members are spaced one from another at a distance of about 500 millimeters.

11. The movable safety rail of claim 6, wherein the at least one guard rail has a diameter of about 48.3 mm with a wall thickness of about 4 mm.

* * * * *